Nov. 26, 1968  A. C. HAACKE  3,412,608
ELECTROMAGNETIC FLOWMETER
Filed May 21, 1965

ALFRED C. HAACKE
INVENTOR.

ALFRED C. HAACKE
INVENTOR.

ALFRED C. HAACKE
INVENTOR.

United States Patent Office 3,412,608
Patented Nov. 26, 1968

3,412,608
ELECTROMAGNETIC FLOWMETER
Alfred C. Haacke, Greece, N.Y., assignor to Taylor Instrument Companies, Rochester, N.Y., a corporation of New York
Filed May 21, 1965, Ser. No. 457,733
10 Claims. (Cl. 73—194)

ABSTRACT OF THE DISCLOSURE

The field windings of an electromagnetic flowmeter are provided in the form of a plurality of saddle-shaped coils, the sides of which are distributed about the periphery of the meter body parallel to the flow through the body, at spaced positions about the circumference of the meter body. The ampere turns of each winding vary with the cosines of the angles the coil sides make with respect to a line joining electrodes, the sides of the coil having the largest ampere turns lying over the electrodes. The sides of the coils form more or less cylindrical bundles which may lie on the cylindrical periphery of the meter body, or be supported thereon by annular forms running circumferentially of the body. While the winding needs no iron, it may be covered with a terminator of transformer steel to insure isolation of the homogeneous field within the meter body from Earth's magnetic field, or other possible exterior magnetic influence.

---

This invention relates to electromagnetic flowmeters. One object of the invention is to provide a magnetic flowmeter having new and improved magnetic field creating structure. It is also the object of the invention to provide new and improved electromagnetic flowmeter structure that is at once simple, economical, sturdy, particularly suitable for the larger sizes of meters and capable of the highest quality of operation.

An electromagnetic flowmeter is basically a segment of pipe in combination with means to create a magnetic field transversely through a cross-section of the bore of the pipe, and circuitry constructed and arranged to detect and utilize voltages across said cross-section normal to the direction of the magnetic field, there being electrodes in the wall of the pipe, which are exposed to the interior of the pipe bore, and to which said circuitry is connected. Generally speaking, the recited elements, except the said circuitry, form a substantially unitary sub-assembly more or less physically distinct from the said circuitry.

The present invention resides in novel improvements in said unitary sub-assembly, to wit, the pipe segment is provided with an electrical winding on its periphery constructed and arranged to approximate an electrical current distribution which at any point on the cross-section of said pipe has a value proportional to the cosine of the angle represented by said point. As a consequence, no iron core or the like is needed to aid in establishing the proper magnetic field across the bore of the pipe, the magnetic field established is inherently highly uniform, and the only limitation on dimensions appears to be that the pipe diameter (inner) need only be sufficiently large. For such sizes, the utility of the present invention is directly proportional to diameter, due to the fact that no iron structure is involved. This is to be contrasted to conventional flowmeters, wherein the larger the diameter, the heavier the iron structure required to generate the desired magnetic field intensity.

As the voltage detecting and utilizing circuitry per se forms no part of the present invention, none will be described herein, for such circuitry is well known and there are many suitable forms thereof, of which those skilled in the art are aware. Suffice it to say that such circuitry may have any or all the several functions of recording, indicating, integrating, controlling, etc., the flow of fluid through the pipe and the present invention is equally useful for all such functions.

Figure 1:
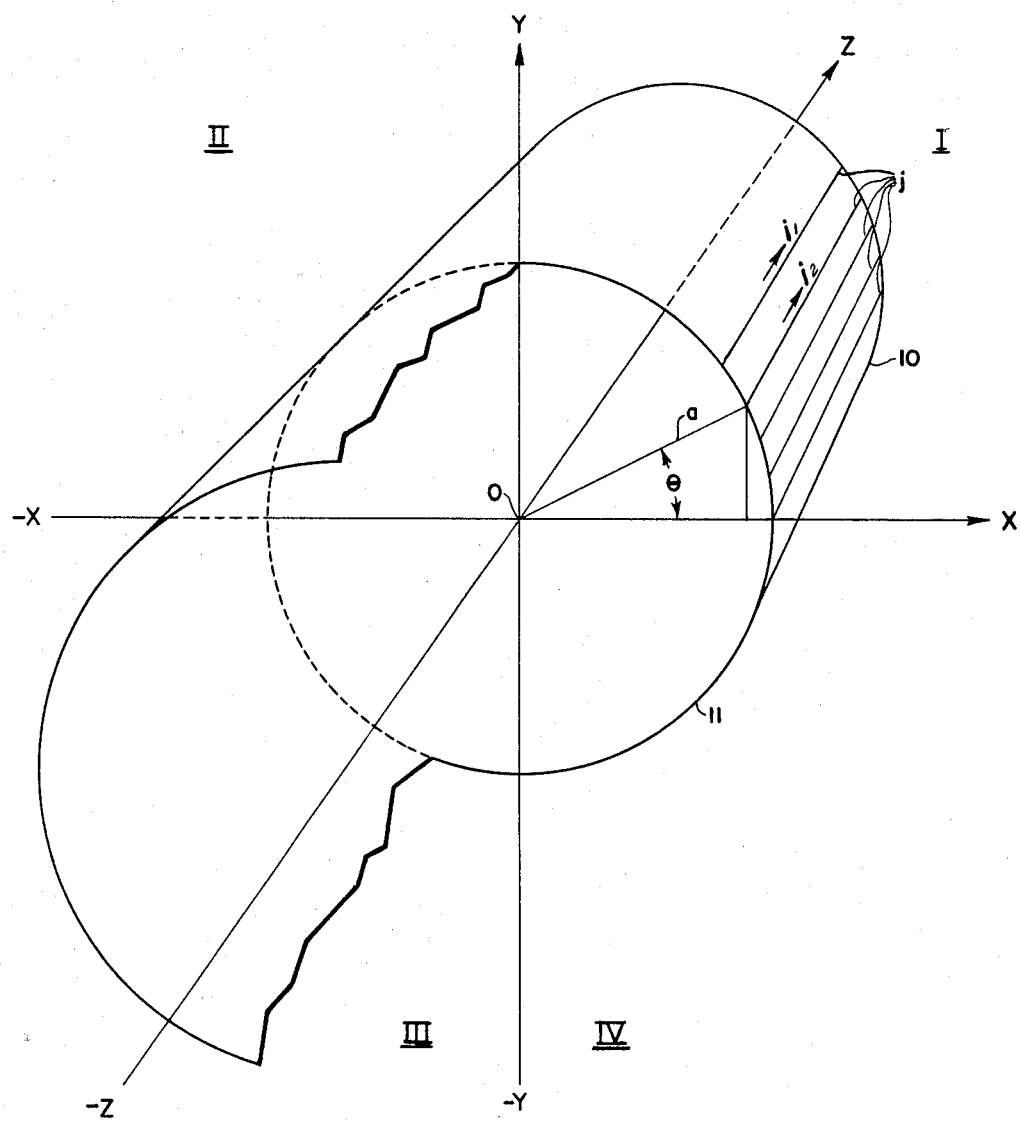
FIGURE 1 is a schematic view illustrative of the principles of the present invention.
Figure 3:
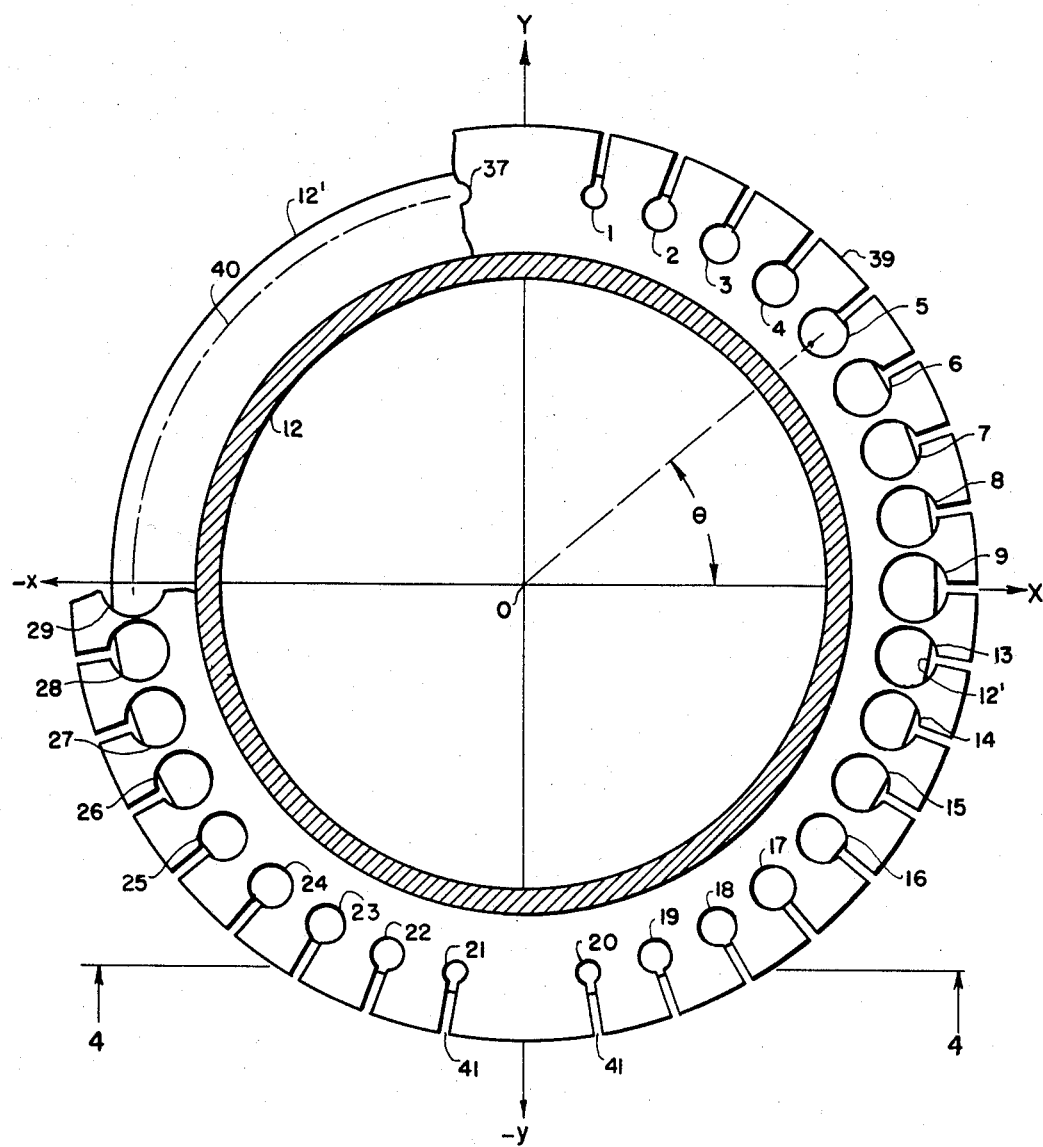
Figure 4:
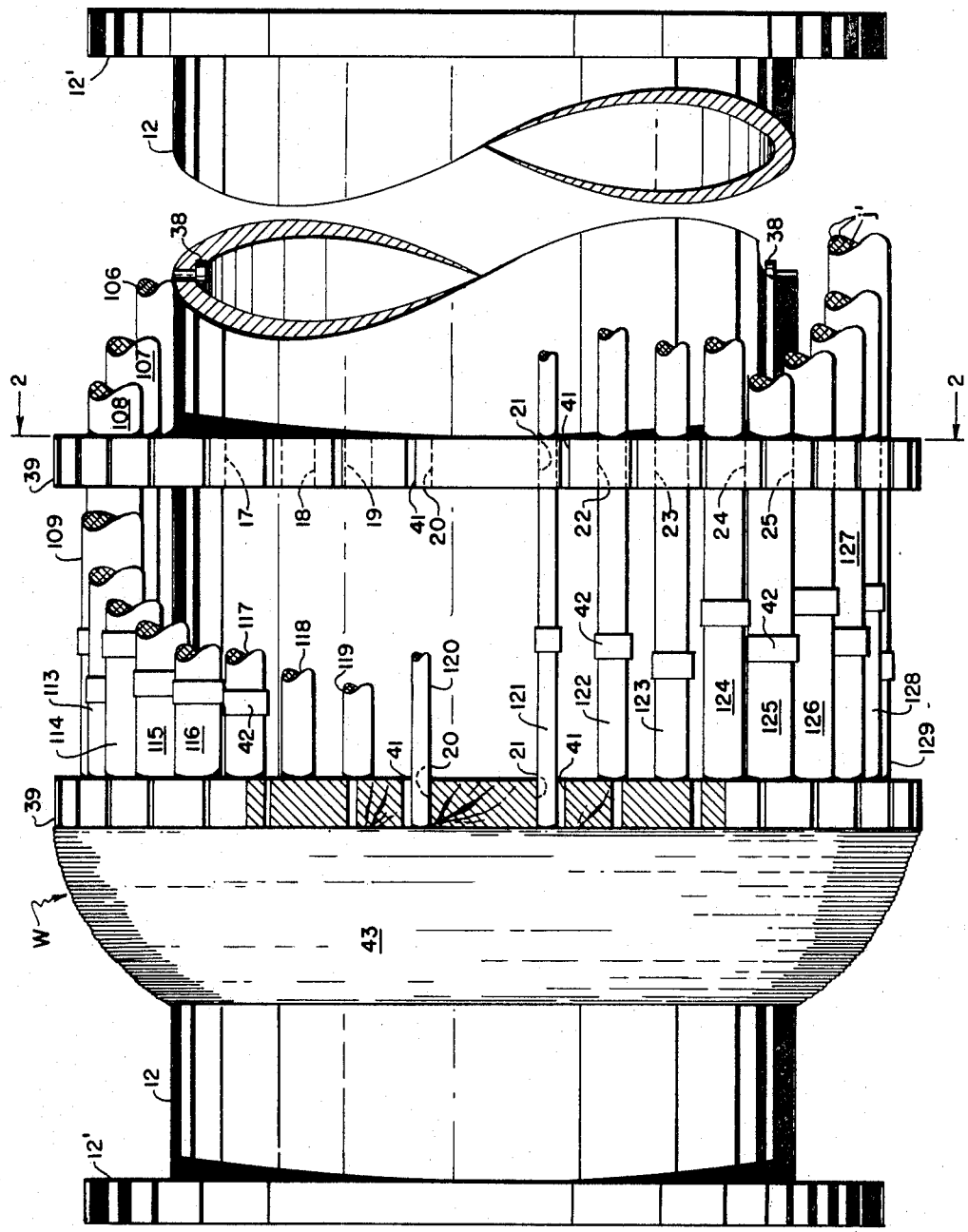

FIGURES 3 and 4 illustrate another mode of realizing the principles of FIGURE 1, FIGURE 3 being a diametral cross-section on line 3—3 of FIGURE 4, and FIGURE 4 being an elevation, partly broken away and including a partial section on line 4—4 of FIGURE 3.

Figure 5:
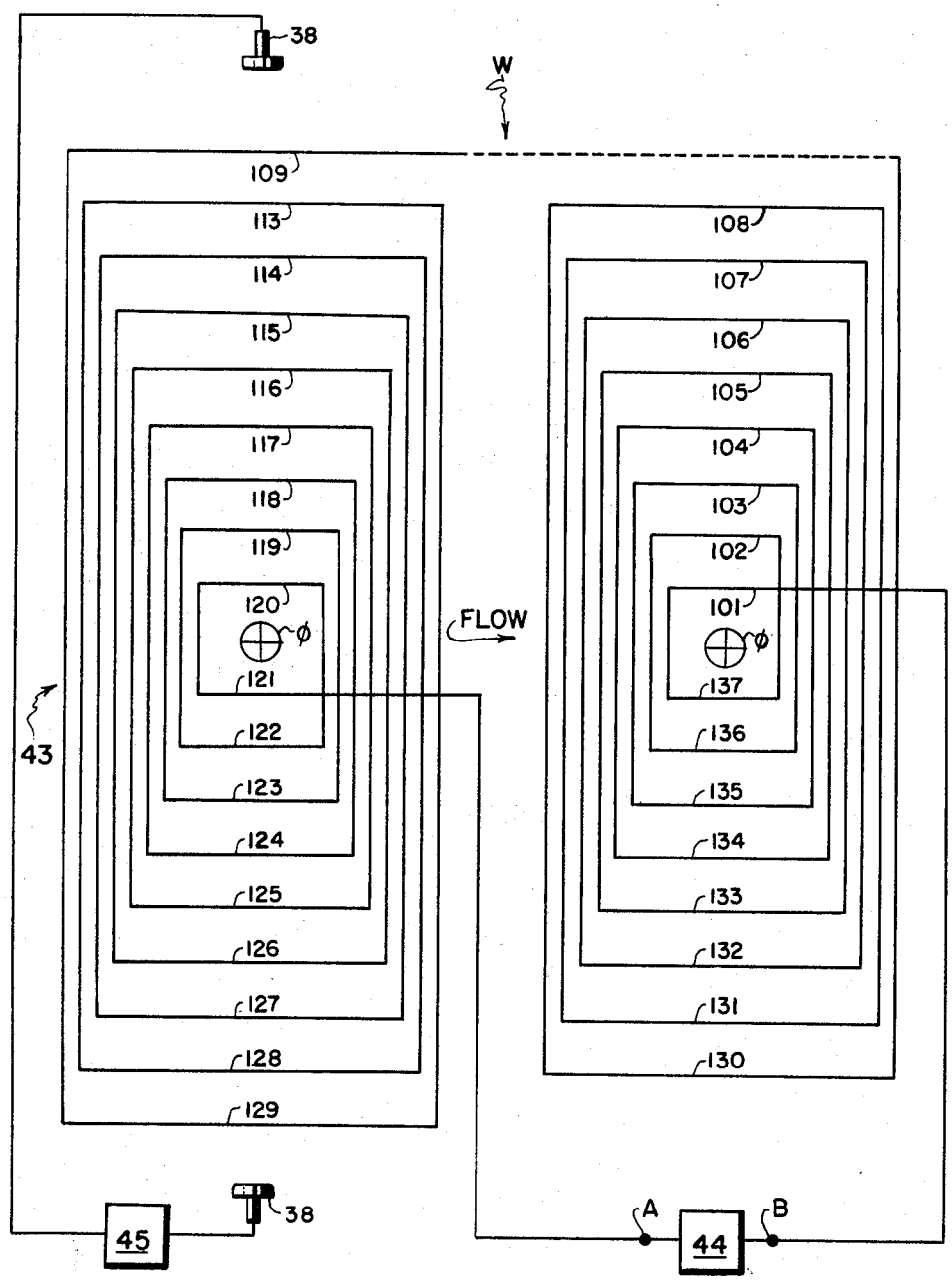

FIGURE 5 is a schematic representation of the winding and electrode configuration that may be adopted in practicing the invention.

Figure 6:
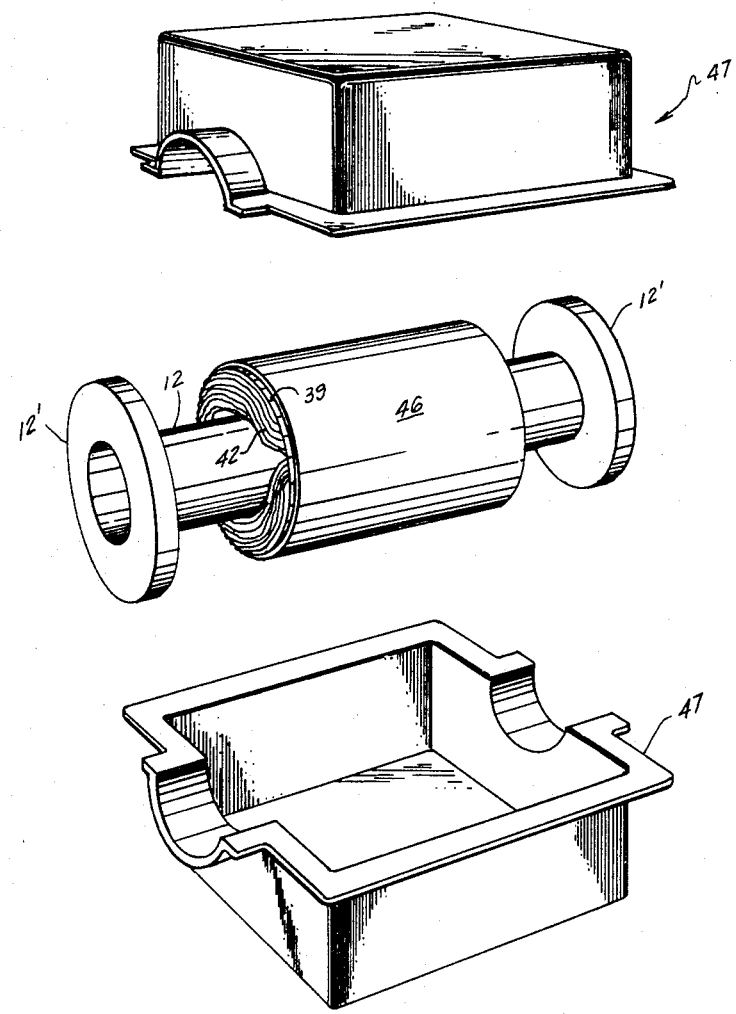

FIGURE 6 is a perspective view showing housing structure for a flowmeter according to the invention.

In FIGURE 1, a cylindrical shell 10 is shown on a conventional set of mutually perpendicular axes $x$, $y$ and $z$ whose positive direction are respectively rightward, upward, and away from the observer, and all of which intersect at the origin $o$. Numerals I, II, III and IV denote the quadrants of the $xy$-plane.

The shell 10 has a circular cross-section 11 in the $xy$-plane and its axis is coincident with the $z$-axis. The shell is supposed to be indefinitely long and composed of thin material of non-magnetic, electrically-conductive nature, and the cross-section 11 is supposed to be remote from any magnetic material.

Consider the generators of the shell, that is, the line segments $j$ lying parallel to the $z$-axis and on the cylindrical surface of the shell and suppose that they represent parallel electrically conductive elements of the shell 10, and that each of said elements has currents $i_1$ and $i_2$ and so on in the positive $z$-direction flowing therealong. Consequently, at any point within the shell 10, there will be a magnetic field normal to the $xz$-plane and in the direction of $-y$, and the total magnetic field intensity in any other direction will be zero.

It is desired, now, that the intensity B of the aforesaid magnetic field be the same anywhere within the shell 10. This condition will be achieved if the currents $i_1$ and $i_2$, and so on, in the elements $j$, vary sinusoidally about the periphery of the shell. Thus, starting with a given current $i_0$ in an element $j$ in the $xz$-plane, and taking the positive side of the $x$-axis and measuring the angle $\theta$ counter-clockwise therefrom and around the $z$-axis, I provide the elements $j$ in such form that (1) $i_\theta = i_0 \cos \theta$, where
  $i_0$ = the current in the element $j$ in the $xz$-plane, and
  $i_\theta$ = the current in the element $j$ removed from the $xz$-plane by the angle $\theta$.

The consequence of the foregoing is that $$B = \frac{uI}{2a}$$

where
  B = scalar magnitude in the $-y$ direction of the magnetic field strength $\bar{B}$,
  $2a$ = the diameter of shell 10,
  $u$ = the magnetic permeability of the region of the shell, and
  $I$ = the total of all the currents flowing in the elements $j$.

In other words, if the surface current density in shell 10 varies sinusoidally about the axis of the shell, then there will be a magnetic field whose direction and strength will be everywhere the same within the shell.

In practice, it is necessary to deal with real conductors of finite dimensions, there are practical limits on the amount of current that can be supplied (and handled), and so on. Accordingly, certain of the elements $j$ are approximated by means of pluralities of real conductors running parallel to each other, and to the $z$-axis, each plurality being spaced from the others and having as its general locus one of the said certain of elements $j$, whereby the said pluralities are located at various angles $\theta$ about the $z$-axis.

Each conductor of all said pluralities is supplied with the same current $j$, and the number of conductors in each plurality is in accordance with Equation (2), supra. Thus (3) $n_\theta = n_0 \cos \theta$, where $n_0$ = the number of conductors in a given one of said pluralities, $\theta$ = the angle between another of said pluralities and said given one thereof, and $n_\theta$ = the number of conductors in the said another one of said pluralities.

In terms of FIGURE 1, then, the element $j$ in the $xz$-plane would be replaced, in effect, by $n_0$ conductors, each having the current $i$ flowing therethrough, so that the current $i_2$ would be $in_0 \cos \theta = in_\theta$.

Each plurality of conductors may be provided in the form of one side of a rectangular coil, thus leaving another side of said coil to provide a second plurality, since the periodicity of the cosine function causes each value of $n_\theta$ to occur four times around the circumference of shell 10. The remaining two sides of each coil are bent to fit like saddles across the pipe and are made of such length as to then locate the first two sides at the angles $\theta$ and $180 \theta$ from the positive side of the $x$-axis. It is sufficient approximation to infinite length if each of said first two sides is a diameter of the shell in length.

In a typical case, values for B and $2a$ are given, since B determines the field necessary to give the minimum voltage to be induced by fluid flow through the field in an electromagnetic flowmeter, and $2a$ corresponds to the diameter of the flow passage of the flowmeter. This leaves $i$ and $n$ as variables since $$I = 4_i \sum_{\theta=0}^{\theta=\pi/2} n_\theta$$

As will be evident to those skilled in the art from the foregoing, the design and execution of an electromagnetic flowmeter sub-assembly according to the invention is quite straightforward and simple. In addition, design and execution is susceptible to many variations, some of which will now be considered.

Figure 2:
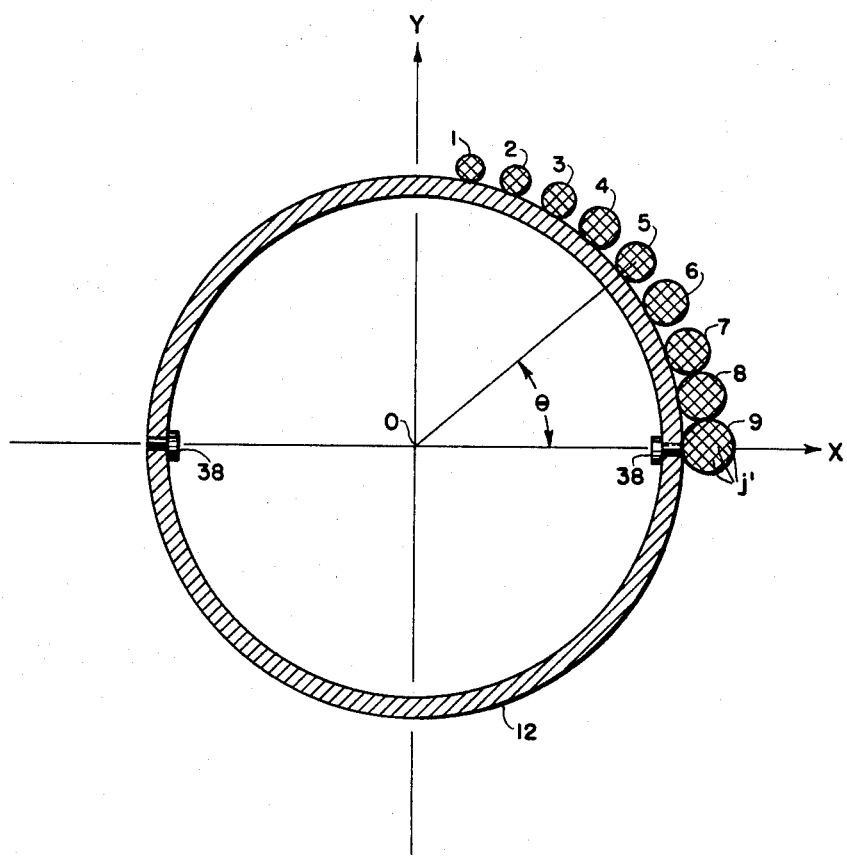
FIGURE 2 is a partial diametral cross-section illustrating rudimentarily one mode of realizing the situation outlined in FIGURE 1.

In FIGURE 2, the reference numeral 12 denotes the real counterpart of shell 10, the view being of a diametral cross-section of a right-cylindrical segment of fiberglass pipe or the like forming the flow path of an electromagnetic flowmeter. The hatched circles numbered 1 through 9 represent cross-sections through sets of bundles of conductors $j'$, the hatching figuratively representing said conductors. The diameters of said circles decrease from $\theta=0$ to $\theta=90$, and the centers are spaced at 10° intervals counter-clockwise from the $x$-axis. The diameter increase is intended to figuratively represent increase in number of conductors $j'$ per bundle or set. By "figuratively," I mean that the verbally-described apportionment of conductors $j'$ is only loosely portrayed by the hatched circles, since it is not feasible, in FIGURE 2, to portray with clarity the actual numbers of conductors and bundle-diameters in true proportions.

In any event, as a practical matter, the numbers of conductors $j'$, are taken as the integers nearest the calculated values thereof, for example, 10, 20, 38, 46, 52, 50, 59 and 60. Moreover, as the conductors are circular in cross-section, they do not solidly fill the volume they occupy, nor need this volume be more than approximately round in cross-section. Nevertheless, it results that each conductor set is in effect a single conductor whose cross-section is the sum of the cross-sections of the individual conductors making up the set, and which has the same current density therein as its fellows, so that, for example, the total current through set 9 is six times the total current through set 1, and it acts as if it is through a hypothetical element $j$ of FIGURE 1 at an angle of 0° from the $x$-axis, whereas the set 1 acts as an element $j$, 80° clockwise from set 9.

In a formal sense, there is a tenth set at 90° (and a 270°) counter-clockwise from set 9, but as this tenth set has zero total current, it is a virtual set and, having therefore no real existence, is omitted from the drawing. It is also to be observed that set 9 would also be counted as one of a like group of 9 sets (not shown) that would be located in the lower right-hand quadrant.

As shown in FIGURE 2, the centers of the conductor sets are at varying distances from the $z$-axis. The equations set forth above when applied to calculate the values of $n$, do not take into account this variation. Taking the sets to be circular and to be made up of conductors $2c$ in diameter, and the outer diameter of pipe segment 12 to be $2a$, the expression for the corrected value $n'$ of any $n$ is, (5) $$n' = n\left(1 + \frac{c}{d}\sqrt{n}\right)$$

where $d$ is the distance between any point P inside the pipe segment 10 and the outer surface of the pipe segment. Taking P on the $z$-axis as the optimum (for the correction of Equation (4) is then too small for points near the pipe wall, but by amounts that tend to be compensated by increase in the magnetic field as the wall is approached) the correction becomes:

(6) $$n' = n\left(1 - \frac{c}{a}\sqrt{n}\right)$$

The corrections apply assuming that (7) $$\frac{1}{n} \gg \frac{c^2}{d^2}$$

which is the case in practice, since inequality (7) expresses a lower limit for pipe-segment diameter (which is nearly the same as $d$, in this instance).

Inequality (7) recognizes the fact that approximation of current distribution in the elements $j$, by means of sets of conductors $j'$, depends on the sets being of sufficient length and of sufficiently narrow cross-section, with respect to pipe segment diameter, to simulate the elements $j$. As a rule of thumb, one diameter of pipe segment is sufficiently long and one-tenth said diameter, or less, is sufficiently narrow. However, extrinsic considerations such as the voltage-detecting capability of the particular meter circuitry to be used, the need to be able to use the same meter circuitry in all sizes of meter sub-assemblies, power available, allowable temperature rise in the winding, and so on, will normally create a minimum size somewhat larger than that implied by inequality (7).

In a typical case, a meter sub-assembly in accordance with the invention would have the following parameters:

$c = 0.028$ inch (#15 A.W.G. copper wire, enameled)
$2a = 10.75$ inches (outer diameter of pipe segment 12)
$B = 50$ gauss
$i = 3$ amperes
$n_0 = 61.8$ (chosen so as to give about 385 conductors).

Using these parameters in Equations (1), (3) and (6), the following table of values of $n$ and $n'$ is obtained:

| $\theta$ | $n$ | $n'$* |
|---|---|---|
| 90 | 0 | 0 |
| 80 | 10.4 | 11 |
| 70 | 21.2 | 22 |
| 60 | 30.9 | 32 |
| 50 | 39.8 | 41 |
| 40 | 47.3 | 49 |
| 30 | 53.6 | 56 |
| 20 | 58.2 | 61 |
| 10 | 61.0 | 63 |
| 0 | 61.8 | 64 |

*Rounded to nearest integer.

Obviously, $n'$ will be zero for 270°; 11 for 100°, 260° and 280°; 22 for 110°, 250° and 290°, and so on.

Equation (2) implies that the same set design data will apply to pipes of all diameters, without requiring any change in design of the voltage detecting circuitry. Thus, if $a$ is halved, B doubles. In practice, this is only approximately true, mainly because halving the inner diameter of the pipe segment less than halves the winding diameter, in a proportion that increases as diameter of pipe segment decreases. Increasing $i$ compensates for this, but there is obviously a limit to how much increase in $i$ there can be. Thus, by allowing $i$ to be increased to as much as 5 amperes, the above figures can be used to design a series of meters using pipe segments ranging from around 6″ O.D. and up, each of which uses the identical detecting circuitry design. Conversely, the approximation of Equation (2) in the practical case improves in proportion as $a$ increases, all other things remaining equal.

The correction described supra is avoided in the form of the invention shown in FIGURES 3 and 4. FIGURE 4 shows a pipe segment 12 having circular flanges 12′ provided for inserting the segment 12 into a pipeline having a liquid flowing therethrough. The winding W, located between the flanges has only about its left half shown, because the other half thereof is the mirror image of its left half. Also, the right-hand end of the pipe, except for its flange 12′, is also omitted, for the same reason. As those skilled in the art will understand, in use, the segment 12 actually forms part of the said pipeline and will normally be of the same diameter as the section of pipeline it forms part of. As indicated generally at 38 (in FIGURES 2 and 4) a pair of diametrically-opposed electrodes will be provided for the purpose of detecting the voltage generated across the inner diameter of pipe between the electrodes. The segment 12 may be fiberglass, or other non-conducting material, or of non-magnetic stainless steel or other conductive material having a rubber sleeve or the like lining and insulating its inner surface from the liquid flowing through the pipe, so as not to shunt the liquid (which may have quite low electrical conductivity) through the material of the segment 12.

In the construction of FIGURE 2, the windings are wound on suitable forms and then fitted to the pipe segment 12. In FIGURES 3 and 4, however, the forms are mounted on the pipe and the windings are then wound on to the forms, and these thereafter remain as winding supports. Thus, I provide the rings 39, four in all (i.e., the two actually shown in FIGURE 4, plus another pair that would be symmetrically located on the omitted part of the construction illustrated by FIGURE 4).

As is evident from FIGURE 3, rings 39 fit the outer circumference of the segment 12 snugly and are provided with a series of holes, there being shown holes 1 through 9 (corresponding to the similarly-numbered circles of FIGURE 2), holes 13 through 29, and hole 37, but there having been omitted the remaining holes that would be numbered 30 through 36 in the upper left-hand quadrant of ring 39, FIGURE 3. In any pair of next adjacent quadrants, the series of holes in the one quadrant is in one to one correspondence, as to location and diameter, with the series in the other quadrant. Thus, hole 23 is equal in diameter to hole 18, hole 18 is 60° clockwise from the x-axis, and hole 23 is 60° counter-clockwise from the x-axis, and all holes have the centers 10° apart on a circle whose center is 0, the intersection of the xy-axis and the center of the cross-section of segment 12. Reference numeral 40 identifies about 90° of arc (in dashed line) of this circle.

Each of the said holes is slotted to and through the outer periphery of each ring 39 as indicated by the reference numeral 41 in several instances, to enable the wire of the windings W to be laid into the holes. The area of each hole is calculated to permit $n_\theta = n_0 \cos \theta$ conductors $j'$ to be packed therein, solidly filling the hole (except, of course, for the interstices necessarily left because the wire is normally round in cross-section). The actual number of conductors is of course the nearest integer to $n_\theta$, as given by Equation (3), supra. Since the centers of the holes are on the circle corresponding to arc 40, correction of $n$ to $n'$, by means of Equation (6), supra, is not in order.

The number of rings 39 is not critical, it being only necessary that there are enough to maintain the bundles of conductors overall parallel with each other and, desirably, with the z-axis. It will be observed that the bundles are spaced from the external surface of pipe segment 12 thus allowing room for various circuit connections, such as to electrodes 38 to be made, without interfering with the wire bundles.

It will be observed, in connection with the discussion of FIGURE 1, that the hypothetical shell 10 is not the interior surface of segment 12, but is rather the right cylindrical shell whose cross-section coincides with the circle to which arc 40 belongs. This is the reason for the correction applied in the case of FIGURE 2: the locus of the centers of the conductor sets or bundles, i.e., of circles 1 through 9, and its fellows (not shown in FIGURE 2) is slightly elliptical, because the said circles are tangent to the circular periphery of the outer surface of the pipe segment 12.

In FIGURE 3, the bundles of conductors $j'$ are denoted by the reference numerals of the holes through which they pass, plus 100. Thus, the bundle passing through holes 24 (of the two rings shown and their two, unillustrated, right-hand counterparts), is bundle 124. The circularity of the cross-section of each bundle may be reinforced by ties, such as are shown at 42, which are essentially just bands or cords encircling the individual bundles, pulled tight around them and fastened in that state. The bundles need not exactly circular, and it is more important that their shapes and positions be maintained constant.

As can be seen from FIGURES 2, 3 and 4, each of the two conductor sets or bundles at 0° and 180° is common to two of the quadrantal arrays of the conductor sets. However, the $n$'s could be computed for 10 degree intervals starting at 5° and ending at 185°, and so on, so that would be four sets each having nine bundles of conductors. As this arrangement provides space for connecting wires to electrodes inside the pipe (such as are briefly indicated at 38) it may be adapted in the form of flowmeter sub-assembly indicated by FIGURE 2, where the conductor bundles are right on the surface of the pipe segment.

As my novel electromagnetic flowmeter sub-assembly needs no iron core, it results that the magnetic field intensity obtained is basically a function of the number of ampere turns in winding W. However, if the range of voltage difference between electrodes 38 is to be maintained constant with respect to meter size, it results that ampere turns must decrease as meter size increases, which means decreasing the current per turn or decerasing the number of turns. The amount of wire L needed in any given case can readily be computed, and, in the example given previously, turns out to be about 1100 feet, or about twice as much wire as would be used in a core-type meter of the same size and field, which latter meter, however, would have some 50 pounds of combined core and winding, as against about 11 pounds of winding of the meter of the said example.

Moreover, the core of the prior art meter increases in size as meter size increases, due to the need to provide the core with stability of shape. The usual core is in effect a ring deformed into a square or rectangular contour. As the meter size increases, the axial length of the ring, the circumference of the ring, and thickness of the ring material must be increased. Winding W, however, increases at a rate substantially less than the square because only the area of the coils forming winding W need increase. This is due to the fact that the effect of the core is to bound a volume, i.e., it is more or less an open-ended box surrounding the flow path of the meter, and as the said volume increases, the volume of the box and the thickness of the walls of the box necessarily increase. The coils of winding W merely provide the conductive elements *j*, and though the said coils therefore perform the field producing function of a core plus winding, their physical nature is not such as to require them to have the form of a continuous wall around a volume corresponding to that bounded by the core.

FIGURE 5 represents one winding scheme that may be adopted. Each horizontal line corresponds to a bundle of conductors *j'*, and has the reference numeral of the bundle to which it corresponds, although the number of turns in each bundle is not portrayed. Thus, the reference numerals 113 through 129 represent the similarly numbered bundles of FIGURE 4, whereas the bundles 101 through 108, and 130 through 137, represent the similarly numbered bundles (only some of which are represented in FIGURE 4) which would be on the other side of pipe segment 12 as shown in FIGURE 4. As FIGURE 5 represents the latter group of bundles shifted rightwardly, so as not to be obscured by the bundles 113 through 129 the line denoting bundle 109 has been continued in dashed line for about the extent of the shift.

The vertical lines 43 in FIGURE 5, which interconnect the bundle lines, abstractly represent the parts of the windings piled in saddle fashion on the surface of pipe segment 12 at the ends of the windings, as for example, as shown at 43, more or less naturalistically in FIGURE 4.

Reference numeral 44 denotes a suitable source of current having terminals A and B. Supposing the current to flow out of terminal A, it proceeds first through bundle 121, then bundle 120, going always clockwise, finally leaving from bundle 101 to return to source 44 via terminal B.

Considered in respect to FIGURES 3 and 4, the direction normal to the view of FIGURE 4 is along the *y*-axis. Hence, taking into account the fact that starting with bundles 120 and 121, each successive pair of opposite bundles is centered on the contour of the circle including arc 40, the said successive pairs are successively further and further from the observer, and proceed in the positive *y*-direction. Accordingly, at any instant the direction of the magnetic field intensity due to the pairs of opposite bundles is in the *y*-direction and has the same sense for each pair of bundles. (The contribution of the vertical conductor lengths, as at 43 is negligible, as it is assumed that the bundles 101 et al. are long enough that in cross-sections through the electrodes 38 the field is uniform, and not affected by the distribution of the conductor lengths 43 et al. running transverse to the *z*-axis, i.e., the axis of segment 12.)

The circled crosses denoted by reference character $\phi$ indicate that the direction of the flux due to the winding W is away from the observer, so that terminal A is positive. The arrow marked FLOW represents the direction of flow of electrically conductive fluid between the two halves of winding W, and in contact with the electrodes 38. Box 45 represents suitable circuitry constructed and arranged to respond to difference in voltage between electrodes 38. Since by Faraday's principle, the flowing fluid acts like a succession of vertical conductors moving transverse to the magnetic flux in the direction $\phi$, voltages will be induced in the fluid between electrodes 38 in proportion to the volumetric rate of flow. It therefore results that the said difference in voltage arises, in proportion to the volumetric rate of flow, and circuitry 45 accordingly responds in accordance with the volumetric flow rate. As is known, the flow may be in the opposite direction, and/or the polarity of source 44 may be reversed, and source 44 may be either AC or DC, though it is generally AC.

Another possible arrangement of the winding W is a parallel one, wherein the start and finish leads do not respectively begin the coil defining bundles 120 and 131 and finish the coil defining bundles 101 and 137. Instead, the start lead may wind half the coil defining bundles 109 and 129, counter-clockwise, say, and out toward the observer so that a final lead results after the coil defining bundles 120 and 121 is wound. Another start lead starts the other half of the coil defining bundles 109 and 129, and proceeds counter-clockwise, but out and away from the observer until the winding of the coil defining bundles 101 and 137 terminates in another finish lead. The two finish leads are connected together and to one of the terminals A and B, and the two start leads are connected together and to the other of said terminals. In terms of FIGURE 5, insofar as winding sense is concerned, it is as if one of the right half of the winding W has been rotated 180° about a vertical axis. As compared to the series case of FIGURE 5, the just-described series-parallel connection causes the winding to require twice the current in order to produce the same field.

Considering the principles illustrated in FIGURE 1, it will be seen that the conductor bundles are the practical way of simulating the theoretical surface current distribution in the shell 10, for the same current flows in every conductor of the bundles (each conductor has the same resistivity, of course). However, it is conceivable that each of the lines denoting bundles in FIGURE 5 could represent a single conductor whose resistance is proportional to cos $\theta$. However, these conductors would have to be parallel-fed, in general (although like-resistance conductors could be in series with each other), and though the desired character of field would result, an impractically large amount of current would be required, in order to obtain this field. The quantitative aspects of the situation are that actual embodiments of the meter, in the form illustrated in FIGURES 3 and 4, may have windings rated at 300–400 volt amperes, for energization by a 117 volt AC source. Thus, the concept just described, of replacing the bundles with single conductors, implies current up to around 3000–4000 amperes (figured at, say, about 3 to 4 amperes per wire per bundle). However, it would not be impractical to cut down the number of conductors in some of the sets of bundles by increasing the current through each conductor in these bundles. Thus, taking the largest bundles to be about 240 ampere turns with 60 conductors, the number of conductors therein could be reduced to 15 if these particular conductors were energized at 16 amperes per conductor. One advantage of doing this would be to reduce bundle size, for the conluctivity of wire increases as its cross-sectional area, other things remaining equal.

Inequality (7), supra, indicates that if the voltage detecting capability of circuitry 45 can be as sensitive as we please, then the lower limit on meter diameter is given by wire size. Thus, using #40 AWG and the *n*'s exemplified previously, a pipe segment 12 on the order of 0.1 inch outer diameter could be used (taking the ratio of largest bundle diameter (the 0° bundle) to pipe segment diameter to be, permissibly, 1 to 10). Again, with unlimited voltage detecting capability, any diameter of pipe segment 12 capable of passing through a given winding could be used.

It is evident that the advantages of a flowmeter constructed in accordance with the principles of the present invention are generally in direct proportion to the diameter of the pipe segment defining the flow path through the meter. While quite large prior art meters have been constructed using iron cores to aid in creating the magnetic field of the meter, I consider that the present invention makes possible the construction of meters larger than any core-using meter heretofore constructed or thought feasible to construct at this time.

The main precaution to be observed in operation of my novel flowmeter is to prevent distortion of the field produced by windings W. Thus, nearby ferrous objects, the earth's magnetic field, and the use of a squarish-shaped housing of ordinary steel on the meter may distort the field. In addition, the usual kind of steel suitable for housing purposes will absorb considerable amounts of power from the field.

As a solution for such problems, according to the invention I provide the terminator 46, as shown in FIGURE 6. The terminator 46 is simply a cylindrical casing of steel of the kind and thickness used in making transformer laminations. This type of steel absorbs a minimum of power and produces a minimum of harmonics, when exposed to changing magnetic fields (for which reasons it is used in transformer construction, of course). Accordingly, the field due to winding W, instead of terminating at infinity, terminates in terminator 46 in a manner symmetrical to the z-axis, so that no distortion of the field within pipe segment results from the presence of terminator 46. Since the said field terminates in terminator 46, it is not affected by the usual sources of distortion external to it, such as steel pipes, etc., and the earth's field. Moreover, a conventional steel housing 47 which may have quite undesirable characteristics, in terms of shape, harmonic production and power absorption, but otherwise desirable from the point of view of cost, and protection of the meter from mechanical, chemical and other influences in its vicinity, may be provided around the terminator 46, serving incidentally as magnetic shielding around terminator 46, also.

The functions of housing 47 and terminator 46 can be combined into one, effectively eliminating terminator 46 and constructing housing 47 in the shape of terminator 46, but at the price of absorption of power from the field of winding W and introduction of harmonics into the total field due to winding W, if ordinary steel be used. The illustrated parallelepipedal form of housing 47 would distort the field in the absence of terminator 46.

Of course, if the meter is to be used in a stable environment wherein its orientation and the magnetic entities in the environment are not subject to change, the meter may be calibrated for said evironment, whereby a nonmagnetic material may be used for housing 47 and the terminator 46 may be dispensed with.

In any event, the terminator 46 is not to be confused with conventional magnetic shielding such as would be offered by Mu-Metal, or the like, materials which are costly, difficult to fabricate, and must be treated with great care in order to avoid deleteriously changing their shielding properties, whereas terminator 46 may be formed by any convenient technique, need not be subjected to any special treatment nor be given any special care in use, and is relatively inexpensive.

While it is evident that the need for terminator 46 would partly be eliminated by DC energization of winding W, it is generally the practice to energize winding W from an AC source, whereby to obviate problems due to polarization of the electrodes 38, having to detect DC voltages, and so on.

I claim:

1. In an electromagnetic flowmeter constructed and arranged for flow of liquid therethrough, said flow meter including, in combination, means for creating magnetic flux through and transverse to said flow and means, including a pair of electrodes, for detecting voltages generated by the interaction between said flux and the flowing liquid it traverses; the improvement wherein the first said means comprises conductive means effectively defining an electrically-conductive cylindrical shell surrounding said flow and having its generators lying parallel to the direction of said flow; said conductive means being constructed and arranged such that the electrical current density at any point of said shell is proportional to the cosine of the angle between a given radius of said shell and the radius thereof that includes said point, and such that electrical current through said conductive means is parallel to the axis of said shell; the dimensions of said conductive means radially of said shell being small compared to the radius of said shell, and one of said electrodes being inside said shell at a point where said angle is zero degrees, the other of said electrodes being inside said shell at a point where said angle is 180 degrees, and there being said conductive means of said shell along generators of said shell corresponding to said points.

2. The invention of claim 1, wherein said conductive means comprises a plurality of electrical conductors parallel to the axis of said shell.

3. The invention of claim 1, wherein said conductive means comprises a plurality of electrical conductors parallel to the axis of said shell, and the number of conductors in the neighborhood of a point on said shell being proportional to $n \cos \theta$, where $n$ is the number of conductors in the neighborhood of a given point on said shell and $\theta$ is the angle between the radii of said shell containing said points.

4. The invention of claim 1, wherein said conductive means comprises a plurality of electrical conductors parallel to the axis of said shell, and the number of conductors in the neighborhood of a point on said shell being proportional to $n \cos \theta$, where $n$ is the number of conductors in the neighborhood of a given point on said shell and $\theta$ is the angle between the radii of said shell containing said points, said plurality of conductors being arranged in a plurality of bundles of conductors, each such bundle having therein $n \cos \theta$ conductors.

5. The invention of claim 1, wherein said conductive means comprises a plurality of electrical conductors parallel to the axis of said shell, and the number of conductors in the neighborhood of a point on said shell being proportional to $n \cos \theta$, where $n$ is the number of conductors in the neighborhood of a given point on said shell and $\theta$ is the angle between the radii of said shell containing said points, said plurality of conductors being arranged in a plurality of bundles of conductors, each such bundle having therein $n \cos \theta$ conductors, and each said point being the center of a bundle.

6. In an electromagnetic flowmeter constructed and arranged for flow of liquid therethrough, said flow meter including, in combination, means for creating magnetic flux through and transverse to said flow and means for detecting voltages generated by the interaction between said flux and the flowing liquid it traverses; the improvement wherein the first said means comprises conductive means effectively defining an electrically-conductive cylindrical shell surrounding said flow and having its generators lying parallel to the direction of said flow; said conductive means comprising a plurality of electrical conductors parallel to the axis of said shell, and the number of conductors in the neighborhood of a point on said shell being proportional to $n \cos \theta$, where $n$ is the number of conductors in the neighborhood of a given point on said shell and $\theta$ is the angle between the radii of said shell containing said points, said plurality of conductors being arranged in a plurality of bundles of conductors, each such bundle having therein $n \cos \theta$ conductors, and there being forms supporting said bundles around said flow of liquid, each said form comprising an annulus provided with spaced circular holes therethrough the axes of which are coincident with generators of said shell, and the radii of which are such that any given one of said holes can contain substantially just $n \cos \theta$ conductors, and said forms being so aligned that holes of the same size have their centers on the same generator of said shell, and said bundles being passed through said forms via said holes.

7. The invention of claim 1, wherein said conductive means comprises a plurality of electrical conductors parallel to the axis of said shell, and the number of conductors in the neighborhood of a point on said shell being proportional to $n \cos \theta$, where $n$ is the number of conductors in the neighborhood of a given point on said shell and $\theta$ is the angle between the radii of said shell containing said points, said plurality of conductors being arranged in a plurality of bundles of conductors, each such bundle being spaced from the other around the periphery of said shell, and each such bundle having therein $n \cos \theta$ conductors.

8. An electromagnetic flowmeter comprising an array of linear conductors arranged to effectively define a right-cylindrical, electrically conductive shell, said array being formed of a plurality of sets of said conductors wherein each set is a bundle of substantially parallel conductors, and said sets being positioned so that the length of each set is spaced substantially one radius of said shell from the axis of said shell, and each said set having just so many conductors therein that if current flows through each conductor thereof, the total current through said each said set is substantially proportional to the cosine of the angle between a radius of said shell terminating at said each said set, and a given radius of said shell; means for conducting fluid into one end of said shell, along the axis of said shell, and out the other end thereof; a pair of electrodes arranged within said shell at positions wherein said fluid would flow between said electrodes; and between which electrodes a potential difference would arise where an electrically conductive fluid to flow through said shell and cut magnet lines of force across said shell due to current flowing through said conductors, and there being a said set of conductors at the zero degrees radius of said shell, and a said set of conductors at the 180 degree radius of said shell, one of said electrodes being located on said zero degrees radius and the other of said electrodes being located on said 180 degree radius.

9. In an electromagnetic flowmeter having a cylindrical pipe segment constructed and arranged for flow of liquid therethrough, said flow meter including, in combination, means for creating magnetic flux through and transverse to said flow and means for detecting voltages generated by the interaction between said flux and the flowing liquid it traverses; the former said means including a plurality of elongated electrically conductive means, said plurality being distributed parallel to one another about the periphery of said pipe segment, and said elongated electrically conductive means being constructed and arranged such that predetermined electrical current densities therein provide a uniform field inside said pipe segment; and there being mounting means mounting said elongated electrically conductive means on said pipe segment, said mounting means embracing each said elongated electrically conductive means individually and fixing same in position with respect to its fellows and to said pipe segment.

10. The invention of claim 9, wherein said mounting means comprises a plurality of annuli mounted on said pipe segment transverse to said elongated electrically conductive means, the latter passing through the material of said annuli, each of said annuli surrounding the periphery of said pipe segment and being spaced from one another along the length of the said pipe segment.

References Cited
UNITED STATES PATENTS

| | | | |
|---|---|---|---|
| 2,771,771 | 11/1956 | Kamp et al. | 73—194 |
| 3,260,868 | 7/1966 | Brenner | 336—225 X |
| 3,274,831 | 9/1966 | Cushing | 73—194 |
| 3,034,002 | 5/1962 | Carlson | 73—194 |

FOREIGN PATENTS

| | | |
|---|---|---|
| 1,308,097 | 9/1962 | France. |

RICHARD C. QUEISSER, *Primary Examiner.*

C. A. RUEHL, *Assistant Examiner.*